US007574400B1

(12) United States Patent
Stokum et al.

(10) Patent No.: US 7,574,400 B1
(45) Date of Patent: Aug. 11, 2009

(54) FINANCING INFORMATION PROCESSING SYSTEM AND METHOD

(75) Inventors: Craig E. Stokum, Westbury, NY (US); Charles J. Giglia, Ozone Park, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 09/573,297

(22) Filed: May 18, 2000

Related U.S. Application Data

(60) Provisional application No. 60/153,452, filed on Sep. 10, 1999.

(51) Int. Cl.
*G06Q 40/00* (2006.01)
(52) U.S. Cl. .............................. 705/38; 705/26; 705/35; 705/36 R
(58) Field of Classification Search ............... 705/35–38
See application file for complete search history.

(56) References Cited

U.S. PATENT DOCUMENTS

| 4,736,294 | A | * | 4/1988 | Gill et al. ....................... 705/38 |
| 4,774,664 | A | * | 9/1988 | Campbell et al. ............... 705/38 |
| 5,189,608 | A | * | 2/1993 | Lyons et al. .................... 705/30 |
| 5,611,052 | A |   | 3/1997 | Dykstra et al. |
| 5,774,883 | A | * | 6/1998 | Andersen et al. ............... 705/38 |
| 5,870,721 | A |   | 2/1999 | Norris ............................. 705/38 |
| 5,875,437 | A |   | 2/1999 | Atkins |
| 5,878,403 | A |   | 3/1999 | DeFrancesco et al. ......... 705/38 |
| 5,940,811 | A |   | 8/1999 | Norris |
| 5,987,434 | A | * | 11/1999 | Libman .......................... 705/36 R |
| 6,064,987 | A | * | 5/2000 | Walker et al. .................. 705/38 |
| 6,076,072 | A | * | 6/2000 | Libman .......................... 705/36 R |
| 6,105,007 | A |   | 8/2000 | Norris |
| 6,202,054 | B1 | * | 3/2001 | Lawlor et al. .................. 705/42 |
| 6,311,169 | B2 | * | 10/2001 | Duhon ............................ 705/38 |
| 6,430,542 | B1 | * | 8/2002 | Moran ............................ 705/36 R |
| 6,640,238 | B1 | * | 10/2003 | Bowman-Amuah ......... 709/201 |

(Continued)

FOREIGN PATENT DOCUMENTS

WO    00/28453    5/2000

(Continued)

OTHER PUBLICATIONS

Roger Rowand, "What's New in computers? NADA Showgoers Find Answers," Automotive News, p. 109, Feb. 15, 1998.

(Continued)

*Primary Examiner*—Narayanswamy Subramanian
(74) *Attorney, Agent, or Firm*—Hunton & Williams, LLP

(57) ABSTRACT

A method and system which uses a communication network to facilitate financing-related activities is provided. A list of financing functions is provided to a user terminal across the communication network. The list of financing functions corresponds to those functions available to a user of the user terminal. The financing functions include at least one of a status function, a report generation function and a financing program function. A financing function request is received from the user terminal. The financing function request corresponds to a selected one of the financing functions provided to the user terminal. A database is accessed to retrieve data corresponding to the received financing function request. The retrieved data is arranged into a predetermined format and transmitted across the communication network to the user terminal.

72 Claims, 11 Drawing Sheets

U.S. PATENT DOCUMENTS

| | | | |
|---|---|---|---|
| 6,640,249 B1 * | 10/2003 | Bowman-Amuah | 709/228 |
| 6,999,938 B1 * | 2/2006 | Libman | 705/10 |
| 7,181,427 B1 * | 2/2007 | DeFrancesco et al. | 705/38 |
| 7,315,841 B1 * | 1/2008 | McDonald et al. | 705/38 |
| 2003/0058277 A1 * | 3/2003 | Bowman-Amuah | 345/765 |

FOREIGN PATENT DOCUMENTS

| | | |
|---|---|---|
| WO | WO0028453 | 5/2000 |

OTHER PUBLICATIONS

Yvette D. Kantrow, "Electric Network Will Link Car Dealers to Many Leaders; Goal Is to Create a Form of EFT Transfer System," American Banker, Inc., p. 1, Feb. 8, 1988.

May Beth Vander Schaaf, "Also Of Interest," Automotive News, p. 24, Feb. 8, 1988.

Yvette D. Kantrow, "National Electronic Network Will Link Car Dealerships with Many Lenders," American Banker, Inc., p. 1, Jan. 29, 1988.

"Coin and Metroteller to Market Electronic Link," PR Newswire, Jan. 28, 1988.

"New York Business Briefs," U.P.I., Jan. 28, 1988.

J. Mac. Rabb and Lyle D. Zeller, "Gaining the Edge from Application Processing Technology," Auto Financing Update, vol. 5, No. 9, pp. 1-3, Feb. 1991.

Wayne Eckerson, "Network Automates Auto Loan Application Process," Network World, p. 2, Mar. 6, 1989.

Mary Patterson, "Metroteller Links Banks to Car Dealers," Business First-Buffalo, vol. 4, No. 22; Sec. 1, pp. 1, Mar. 21, 1998.

Yvette D. Kantrow, "Debating the Dealer-Lender Link; Vendor Presses Bankers to Develop Standards for Electronic Network," The American Banker, Inc., p. 10, Mar. 16, 1988.

Joe Della Posta, "CBT Joins Network Linking Auto Dealers With Lenders," Southern Connecticut Business Journal, vol. 19, No. 8, Sec. 1, p. 3, Mar. 14, 1988.

Phil Johnston, "System to Link Lenders, Automobile Dealerships," Rochester Business Journal, vol. 3, No. 32, Sec. 1, p. 19, Feb. 22, 1998.

* cited by examiner

FIG. 6

CONTACT STATUS FOR SMITH MOTORS

CONTACT US | SIGN OUT | HELP

Sidebar (22, 24):
- APPLICATIONS & CONTRACTS
  - SUBMIT AN APPLICATION
  - APP. TRANSMISSION STATUS
  - APPLICATION STATUS
  - CONTRACT STATUS
- REPORTS
  - DEALERS RESERVE
  - PROSPECT REPORT
- RATES & PROGRAMS
  - LEASE PROGRAMS
  - RETAIL RATES
  - PAYMENT CALCULATOR
  - RESIDUAL VALUE BOOK
- PAYOFF QUOTES
- DOCUMENTS & FORMS
- PRODUCT INFORMATION
- INDUSTRY LINKS
  - LOCATIONS
- DEALER SWITCH
- DEALER INFO

SEARCH BY: REFERENCE NUMBER ▼    ENTER INFO [____] SUBMIT (28)

DEALERS PAID BY CHECK: CONTRACTS BOOKED AFTER 4:30pm E.S.T. WILL BE FUNDED THE NEXT BUSINESS DAY
DEALERS PAID BY EFT: CONTRACTS BOOKED AFTER 7:30pm E.S.T. WILL BE FUNDED THE NEXT BUSINESS DAY
* CLICKING ON THIS CATAGORY WILL SORT THE DATA

| °CONTRACT RECEIVED DATE | °REFERENCE NUMBER | °APPLICANT LAST NAME | APPLICANT FIRST NAME | N/U/D | °PRODUCT | STATUS | BOOKED DATE | BOOKED TIME |
|---|---|---|---|---|---|---|---|---|
| 10/01/1999 | 9927411171 | VAN | MARTIN | N | RETAIL | BOOKED | 10/01/1999 | 01:15pm |
| 12/31/1900 | 0036610590 | VAN | MARTIN | N | RETAIL | BOOKED | 12/31/2000 | 03:51pm |

[PRINTABLE FORMAT] (30)    [DOWNLOAD TO SPREADSHEET] (32)

FIG. 7

CONTRACT STATUS DETAIL FOR SMITH MOTORS

APPLICATION INFORMATION (36)

| STATUS | LAST NAME | FIRST NAME | MIDDLE INITIAL |
|---|---|---|---|
| BOOKED | VAN | MARTIN | L |

| ACCOUNT # | APPLICATION RECV'D DATE | | |
|---|---|---|---|
| 99274111714 | 10/01/1999 | | |

VEHICLE INFORMATION (38)

| NEW/USED | YEAR | MAKE | MODEL/TRIM |
|---|---|---|---|
| N | 99 | FORD | F250 REGUL |

| WARRANTY | VIN # | | |
|---|---|---|---|
| 1235 | FTSW31F6XEE44 | | |

FINANCING INFORMATION (40)

| PRODUCT | AMOUNT FINANCED | TERM | CUSTOMER RATDE | BUY RATE | BOOKING DATE |
|---|---|---|---|---|---|
| RETAIL | $2,000 | 72 | 8.24% | 8.24% | 10/01/1999 |
| AMOUNT | DEALER BONUS | OFFICIAL | FIRST PAY | GAP | DEALER |

FIG. 9

DEALER RESERVE STATEMENT FOR SMITH MOTORS

VIEW MONTHLY STATEMENT FOR: [OCTOBER 1999]   [SUBMIT]   } 44

TRANSACTION SUMMARY

| STARTING RESERVE BALANCE | $429.55 | NET NEW LOANS | $96,067.80 |
|---|---|---|---|
| NET UP-FRONT | $1,635.60 | NET REPOSSESSIONS | $0.00 |
| NET AS EARNED | $502.36 | NET CHARGEOFFS | $0.00 |
| NET CHARGEBACK | $0.00 | NET PAYOFFS | $0.00 |
| NET ADJUSTMENTS | $0.00 | TOTAL LOAN BALANCE | $599,752.64 |
| NET CHECK/EFT | $0.00 | ACCUMULATED HOLDBACK | $0.00 |
| CURRENT RESERVE BALANCE | 2,567.51 | REQUIRED HOLDBACK | $0.00 |

} 46

TRANSACTION DETAIL

| EFFECTIVE DATE | ACCOUNT NUMBER | CUSTOMER NAME | NOTE DATE | TRAN CODE | TRANSACTION DESCRIPTION | AMOUNT | DR/CR |
|---|---|---|---|---|---|---|---|
| 08/01/1999 | 100000000 | TEST NICOLE | 08/01/1999 | 7441 | INCR UP-FRONT | $567.80 | C |
| 10/01/1999 | 100000000 | TEST NICOLE | 06/11/1999 | 7442 | INCR AS EARNED | $58.76 | C |
| 10/01/1999 | 198174174 | PICK UP WALTER | 06/22/1999 | 7442 | INCR AS | $31.71 | C |

} 48

Sidebar (22):
APPLICATIONS & CONTRACTS
  SUBMIT AN APPLICATION
  APP. TRANSMISSION STATUS
  APPLICATION STATUS
  CONTRACT STATUS
REPORTS
  DEALERS RESERVE
  PROSPECT REPORT
RATES & PROGRAMS
  LEASE PROGRAMS
  RETAIL RATES
  PAYMENT CALCULATOR
  RESIDUAL VALUE BOOK
PAYOFF QUOTES
DOCUMENTS & FORMS
PRODUCT INFORMATION
INDUSTRY LINKS
LOCATIONS
DEALER SWITCH
DEALER INFO

FIG. 10

DATE: 10/01/1999     RATE SHEET ID# N/A

| CUSTOMER NAME: | PICK UP WALTER |
| ACCOUNT # : | 19817417492101 |
| ACAPS #: | 981741749210 |
| APPLICATION RECEIVED DATE: | 00/00/0000 |
| APPROVED DATE: | 00/00/0000 |
| BOOKING DATE: | 07/13/1996 |
| MATURITY DATE: | 06/25/2004 |

} 54

| AMOUNT FINANCED: | $28,987.75 |
| CUSTOMER RATE: | 9.75% |
| BUY RATE: | 8.25% |
| ADJUSTED BUY RATE: | 0.00% |
| LIMITED RECOURSE PAYOFF | |
| LIMITED RECOURSE CHARGEOFF | |

AS EARNED DEALER RESERVE

| 09/09/1999 | AMOUNT | $31.71 |
| 09/01/1999 | AMOUNT | $30.69 |
| 07/31/1999 | AMOUNT | $31.72 |
| 07/01/1999 | AMOUNT | $31.96 |
| 06/04/1999 | AMOUNT | $26.15 |
| 06/03/1999 | AMOUNT | $1.05 |
| 06/02/1999 | AMOUNT | $1.05 |
| 05/29/1999 | AMOUNT | $3.13 |

} 56   } 52

58

22

APPLICATIONS & CONTRACTS
SUBMIT AN APPLICATION
APP. TRANSMISSION STATUS
    APPLICATION STATUS
    CONTRACT STATUS
REPORTS
    DEALERS RESERVE
    PROSPECT REPORT
RATES & PROGRAMS
    LEASE PROGRAMS
    RETAIL RATES
    PAYMENT CALCULATOR
    RESIDUAL VALUE BOOK
PAYOFF QUOTES
DOCUMENTS & FORMS
PRODUCT INFORMATION
INDUSTRY LINKS
    LOCATIONS
DEALER SWITCH
DEALER INFO

CONTACT US | SIGN OUT | HELP

PROSPECT REPORT FOR SMITH MOTORS

CHOOSE WHITCH PROSPECTS TO VIEW BY SELECTING THE TIME PERIOD AND PRODUCT TYPE

| FROM | TO | PRODUCT | |
|---|---|---|---|
| NOV 1999 | NOV 2000 | ALL ▼ | SUBMIT |

} 60

CLICK ON A CUSTOMER NAME TO VEIW DETAILS.
A FLAG IN THE NOTES BOX MEANS THAT YOU HAVE ENTERED YOU OWN COMMENTS ON THE CUSTOMER.

| MATURITY DATE | CUSTOMER NAME | NOTES |
|---|---|---|
| 04/18/2000 | CAR ,JOSE M | |
| 06/16/2000 | TRUCK , THAN | |

} 62

30 — [PRINTABLE FORMAT]     [DOWNLOAD TO SPREADSHEET] — 32

[TERMS & CONDITIONS]

APPLICATIONS & CONTRACTS
SUBMIT AN APPLICATION
APP. TRANSMISSION STATUS
    APPLICATION STATUS
    CONTRACT STATUS
REPORTS
    DEALERS RESERVE
    PROSPECT REPORT
RATES & PROGRAMS
    LEASE PROGRAMS
    RETAIL RATES
    PAYMENT CALCULATOR
    RESIDUAL VALUE BOOK
PAYOFF QUOTES
DOCUMENTS & FORMS
PRODUCT INFORMATION
INDUSTRY LINKS
    LOCATIONS
DEALER SWITCH
DEALER INFO

CONTACT US | SIGN OUT | HELP

PROSPECT REPORTER FOR SMITH MOTORS

CUSTOMER INFORMATION
JOSE M. CAR
123 ANY ST.
NEW YORK, N.Y. 10000
(212-555-0000)
} 66

VEHICLE INFORMATION
1997 NISSAN PATHFINDER
VIN: N8AR05Y9VW1
} 68

ACCOUNT INFORMATION
ACCOUNT NUMBER: n496077
PRODUCT: LEASE
MATURITY DATE: 04/18/2000
MONTHLY PAYMENT: $299.06
PAYOFF QUOTE: $19,227.88
GOOD THROUGH: 08/18/1999
} 70

[NEXT] — 80

NOTES ENTER YOUR OWN COMMENTS
} 72

76 — [SAVE]   [CLEAR] — 78

[BACK TO PROSPECT SUMMARY]
[GET PAYOFF QUOTE]

| | | | |
|---|---|---|---|
| APPLICATIONS & CONTRACTS | | CONTACT US | SIGN OUT | HELP | |
| SUBMIT AN APPLICATION | | | |
| APP. TRANSMISSION STATUS | | | |
| APPLICATION STATUS | | | |
| CONTRACT STATUS | LEASE PROGRAM FOR: SMITH MOTORS | | |

Panel (22) menu items:
- APPLICATIONS & CONTRACTS
  - SUBMIT AN APPLICATION
  - APP. TRANSMISSION STATUS
  - APPLICATION STATUS
  - CONTRACT STATUS
- REPORTS
  - DEALERS RESERVE
  - PROSPECT REPORT
- RATES & PROGRAMS
  - LEASE PROGRAMS
  - RETAIL RATES
  - PAYMENT CALCULATOR
  - RESIDUAL VALUE BOOK
- PAYOFF QUOTES
- DOCUMENTS & FORMS
- PRODUCT INFORMATION
- INDUSTRY LINKS
- LOCATIONS
- DEALER SWITCH
- DEALER INFO

LEASE PROGRAM FOR: SMITH MOTORS

SEARCH BY: [TITLE ▼] [_____] [SUBMIT]
SEARCH BY: [START DATE ▼] [CURRENT ▼] [SUBMIT]   }84

CURRENT LEASE PROGRAMS
TITLE             PROGRAM ID   START DATE   END DATE     FUND BY DATE
HONDA RATES       99HON        07/15/1999   10/15/1999   10/25/1999   }86

[HISTORICAL LEASE PROGRAMS] 88

[TERMS & CONDITIONS]

FIG. 16

HONDA DEALERS

LET US HELP YOU SATISFY YOUR CUSTOMER'S NEEDS WITH...

ODD TERM LEASING!

[ 39 MONTHS ]

1999 ACCORD, CIVIC, ODYSSEY, & CRV

| | ACCORD 2dr EX | | CIVIC 4dr LX | | ODYSSEY EX | |
|---|---|---|---|---|---|---|
| | CAF | AHFC | CAF | AHFC | CAF | AHFC |
| MSRP | $22,115 | 22,115 | $16,045 | $16,045 | $26,215 | $22,215 |
| SELLING PRICE | $22,610 | $22,565 | $16,540 | $16,495 | $26,710 | $26,665 |
| ACQ FEE | $495 | $450 | $495 | $450 | $495 | $450 |

FINANCING INFORMATION PROCESSING SYSTEM AND METHOD

CROSS-REFERENCE TO RELATED APPLICATION

This application is based on, and claims priority to, U.S. Provisional Application No. 60/153,452, entitled DEALER MANAGEMENT SYSTEM, filed Sep. 10, 1999, whose contents are incorporated herein by reference.

BACKGROUND OF THE INVENTION

1. Field of the Invention

The present invention relates to a method and system for processing and presenting financing information to a user, and more particularly, to a method and system which allows a user to review financing account data and generate detailed reports which allows the user to better market financing alternatives to their customers.

2. Discussion of Related Art

Owners and operators of businesses whose sales strongly rely on financing by its customers have long sought ways to facilitate the financing activities associated with their products. This is particularly so in the case of an automobile dealer whose customers may want to take advantage of myriad financing opportunities available to them.

Typically, vendors employ rate sheets or access computerized systems which provide the vendor with the options available to them and their customers. The vendor must then go through the financing options in an effort to determine the best option for the customer as well as an option which will be profitable for the vendor. This is the case because many financial institutions provide the vendor with a percentage of the financing revenue derived as a result of the customer entering into a designated financing arrangement. For example, an automobile dealer who gets a customer to sign up for a particular type of lease may receive a percentage of the lease proceeds from the financial institution underwriting the lease.

The financial account associated with this arrangement is typically referred to as a "reserve" account. A reserve account corresponding to a motor vehicle dealer is referred to as a dealer reserve account. Reserve accounts allow vendors to track the credits they receive as a result of sales and financing activity and the debits incurred as a result of charge backs, adjustments, payoffs, etc. Typically, the vendor is provided with a periodic paper statement outlining the reserve activity and balances. This paper statement is wasteful, and often does not represent the current state of the vendor's reserve account. The vendor also can not quickly determine the impact on their reserve account resulting from customers' payment histories. It is desirable, therefore, to provide a vendor with electronic access to their reserve account to obtain up-to-date data regarding account status, and further to integrate the electronic access with other services which may be useful to the vendor in facilitating their financing activities.

Systems have also been developed which allow a vendor to electronically complete and submit a financing application to one or more financial institutions on behalf of a customer. For example, U.S. Pat. No. 5,878,403, issued to DeFrancesco, is directed to a system which allows a car dealer to electronically prepare and submit a credit application to one or more funding institutions and alerting the vendor as to the result of the credit decision. While these systems facilitate loan application entry and the dissemination of a credit decision, these systems do not support the actual contract process, i.e., the process by which the customer accepts the funds in exchange for a promise to pay the loan and do not provide the vendor with the ability to generate detailed reports which allows the vendor to market their products to prospective customers.

Similarly, U.S. Pat. No. 5,870,721, issued to Norris, is directed to a system which allows an applicant to electronically submit a loan application to a lending institution which then checks the applicant's credit and issues a determination. However, this system does not track contract status nor provide any prospecting information, particularly because it is the applicant who directly seeks the loan.

In addition, no system currently exists which seamlessly integrates financing functions into a simple network-based application which allows a user to obtain reserve account data, check contract status for pending customer contracts, obtain current lease or other loan program information and generate detailed reports for prospective customers based on a set of criteria determined by the vendor and to review reports relating to the vendors particular performance as against sales volumes, efficiency levels and the quality of the loans which have been generated as a result of their activity.

SUMMARY OF THE INVENTION

The present invention provides a method for using a communication network to facilitate financing-related activities, in which a list of financing functions is provided to a user terminal across the communication network. The list of financing functions corresponds to those functions available to a user of the user terminal. The financing functions includes at least one of a status function, a report generation function and a least one financing program function. A financing function request is received from the user terminal in which the financing function request corresponds to a selected one of the financing functions provided to the user terminal. A database is accessed to retrieve data corresponding to the received financing function request. The retrieved data is arranged into a predetermined format. The formatted data is transmitted across the communication network to the user terminal.

The present invention also provides a system which uses a communication network to facilitate financing activities, in which there is a database and an information processor coupled to the database. The information processor has a network interface coupling the information processor to the communication network and a has a central processing unit. The central processing unit accepts requests from a user terminal coupled to the communication network. The central processing unit executes functions which include:

receiving from the user terminal, a selected financing function request, the selected financing function request corresponding to a financing function selected from a list of financing functions made available to a user of the user terminal, the list of financing functions including at least one of a status function, a report generation function and a financing program function;

accessing the database to retrieve data corresponding to the received financing function request;

arranging the retrieved data into a predetermined format; and using the network interface to transmit the formatted data to the user terminal.

The present invention additionally provides a storage medium storing programmatic code for a network-based financing information system which, when executed, performs acts in which a requested financing function request is received from a user terminal. The requested financing function request corresponds to a financing function selected from a list of financing functions made available to a user of the user terminal. The list of financing functions includes at least one of a status function, a report generation function and a financing program function. A database is accessed to retrieve data corresponding to the received financing function request. The retrieved data is arranged into a predetermined format. The formatted data is transmitted across the communication network to the user terminal.

As another aspect of the invention, a method for using a communication network to facilitate financing activities of a vehicle dealer is provided in which a list of dealer financing functions is provided to a user terminal across the communication network. The list of financing functions corresponds to those functions available to a user of the user terminal. The financing functions include at least one of a contract status function, a dealer reserve report function, a prospect report generation function and a financing program function. A financing function request is received from the user terminal in which the financing function request corresponds to a selected one of the financing functions provided to the user terminal. A database is accessed to retrieve data corresponding to the received financing function request. The retrieved data is arranged into a predetermined format. The formatted data is transmitted across the communication network to the user terminal.

As still another aspect of the present invention, a method for using a communication network to facilitate financing activities of a vehicle dealer is provided in which a contract status function request for a vehicle contract transmitted across the communication network by a user terminal is received. A database is accessed to retrieve at least one of summary contract data and detailed contract data in accordance with the received contract status function request. The summary contract data and the detailed contract data each include a contract receipt date, a contract status and contract booking data. The retrieved data are arranged into a predetermined format. The formatted data are transmitted across the communication network to the user terminal.

As still yet another aspect of the present invention, a method for using a communication network to facilitate financing activities of a vehicle dealer is provided in which a function request is received. The function request being one of a reserve report function request and a prospect report generation function request. A database is accessed to retrieve one of reserve report data and prospect report data corresponding to the received function request. The reserve report data includes at least one of summary reserve data, detailed reserve data and account data. The prospect report data includes at least one of summary prospect data and detailed prospect data to identify potential vehicle lease and vehicle purchase customers. The retrieved data is arranged into a predetermined format. The formatted data is transmitted across the communication network to the user terminal.

The present invention also provides a method for using a communication network to facilitate financing activities of a vehicle dealer in which a vehicle program function request transmitted by a user terminal across the communication network is received. The vehicle program function request being for one of a lease program and loan program. A database is accessed to retrieve data corresponding to the received vehicle program function request. The retrieved data comprises at least one of current program summary data, current program detail data and archival program data. The current program summary data identifies programs currently available to the user, the current program detail data identifies programs and corresponding financing rates currently available to the user and the archival program data corresponds to archival data of previous programs and financing rates. The retrieved data is arranged into a predetermined format. the formatted data is transmitted across the communication network to the user terminal.

Other features and advantages of the present invention will become apparent from the following description of the invention which refers to the accompanying drawings.

BRIEF DESCRIPTION OF THE DRAWINGS

FIG. 6 is an example of a contract summary display screen arranged in accordance with the principles of the present invention;

FIG. 7 is an example of a detailed contract display screen arranged in accordance with the principles of the present invention;

FIG. 9 is an example of a vendor reserve account summary display screen arranged in accordance with principles of the present invention;

FIG. 10 is an example of a reserve detail display screen arranged in accordance with principles of the present invention;

FIG. 12 is an example of a prospect report summary display screen arranged in accordance with principles of the present invention;

FIG. 13 is an example of a detailed prospect report display screen arranged in accordance with the principles of the present invention;

FIG. 15 is an example of a lease program summary display screen arranged in accordance with the principles of the present invention; and FIG. 16 is an example of a display screen of lease program details arranged in accordance with principles of the present invention.

DETAILED DESCRIPTION OF EMBODIMENTS OF THE INVENTION

Figure 1:
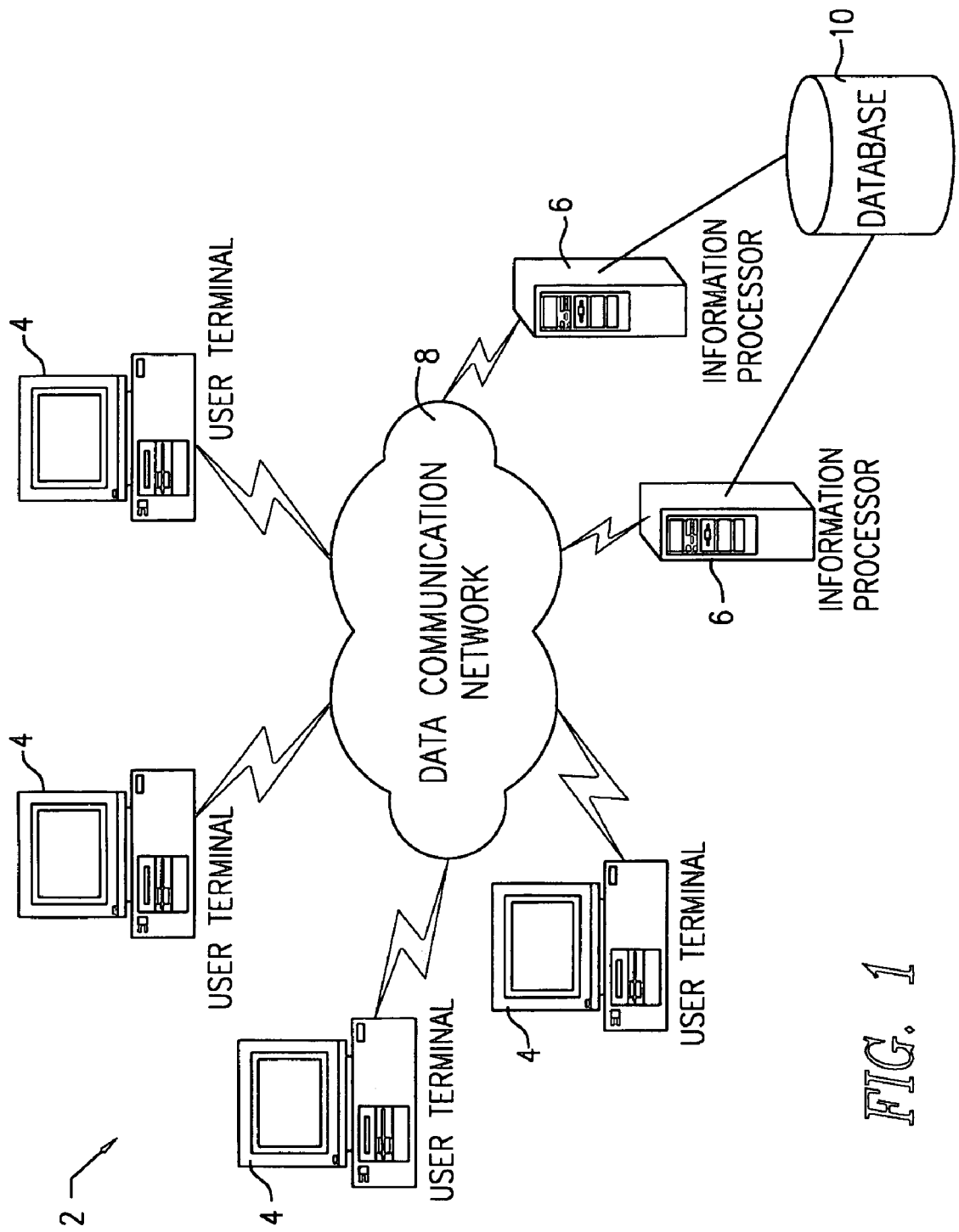
FIG. 1 is a diagram of the hardware elements of the system of the present invention.

Referring now to the drawing figures in which like reference numbers refer to like elements, there is shown in FIG. 1 a diagram of the hardware elements of the system of the present invention, designated generally as "2".

System 2 provides a complete and comprehensive environment for a financing system, allowing a user to generate reports relating to the dealer's performance, check reserve accounts, prospect for potential customers, check the status of pending customer contracts, check vendor performance as measured against certain financing criteria and the like. System 2 is preferably comprised of one or more user terminals 4 coupled to one or more information processors 6 through data communication network 8. As used herein, the term "user"

refers to a vendor or vendor employee engaged in the sale or lease of a product or service (the terms "product" and "service" are used interchangeably herein). The term "customer" refers to the purchaser of the goods or services offered by the vendor. For example, a car dealer is a vendor, the car dealer salesperson a user, and the purchaser of the car a customer.

It should be noted that although user terminal 4 and information processor 6 are shown as each coupled to a single data communication network 8, this arrangement is shown merely for the convenience of aiding explanation of the present invention and is not limited to such. For example, data communication network 8 can be the Internet or other public or private network comprised of multiple communication networks, coupled together by network switches or other communication elements.

User terminals 4 are comprised of any computer platform capable of running an Internet web browser or similar graphical user interface software. Examples of suitable web browsers include MICROSOFT's INTERNET EXPLORER and NETSCAPE's COMMUNICATOR. The computer platform for user terminal 4 can vary depending on the needs of its particular user and can range from a desktop, laptop or handheld personal computer or personal digital assistant to a UNIX-based workstation or mainframe computer.

User terminals 4 preferably communicate with information processors 6 using the Transmission Control Protocol/Internet Protocol (TCP/IP) upon which particular subsets of that protocol can be used to facilitate communications. Examples include the Hypertext Transfer Protocol (HTTP), data carrying Hypertext Mark-Up Language (HTML) web pages, Java and Active-X applets and File Transfer Protocol (FTP). Information processors 6 are capable of generating/retrieving the HTML pages and applets, and communicating them to user terminals 4. For example, communication may take the form of files delivered using FTP or Extensible Mark-Up Language (XML) formats as agreed to by the sending and receiving parties.

Information processors 6 are comprised of one or more central processing units coupled to one or more databases 10 as described in detail below. In addition, information processors 6 further comprise a network interface (not shown) to couple the processor to data communication network 8, and include provisions for a web site or other technology which can create a network presence from which the provider of information processor 6 can interact with user terminals 4. Technologies including hardware and software for establishing web sites such as an Internet web site are known.

Information processor 6 can be comprised of any suitable processor arrangement designed to accommodate the expected number of users and transactions for the particular system in which these elements will be implemented. Known software languages and database technologies can be used to implement the described processes. Database 10 and programmatic code and the like are stored in suitable storage devices within, or which have access to, information processor 6. Although not shown, database 10 can include a suitable database management system processor which operates thereon. In addition, although database 10 is shown as a separate entity in FIG. 1, it is contemplated that database 10 can be implemented as part of a storage device within information processor 6, or can even be coupled to information processor 6 across a communication link. Database 10 is preferably a multidimensional database which is analyzed using on-line analytical processing (OLAP) tools.

It should be noted that references to "selecting" or "choosing" refer to the selection by the user of an object presented on the display of user terminal 4. Also, the term "link" is used to mean a reference to different display data such an HTML reference to a different web page.

Data connections between user terminal 4 and data communication network 8 can be any known arrangement for accessing a data communication network, such as dial-up Serial Line Interface Protocol/Point-to-Point Protocol (SLIP/PPP), Integrated Services Digital Network (ISDN), dedicated leased-line service, broadband (cable) access, Digital Subscriber Line (DSL), Asynchronous Transfer Mode (ATM), Frame Relay or other known access technique. Information processors 6 are coupled to data communication network 8 in a similar fashion. However, it is preferred that the link between the information processor 6 and data communication network 8 be arranged such that access to information processor 6 is always available.

Information processors 6 preferably include one or more central processing units used to execute software code in order to control the operation of information processor 6, read only memory, random access memory, a network interface to transmit and receive data to and from other computer devices across the network, and a storage device for storing programmatic code, databases and application data such as the hard drive, floppy disk drive, tape drive, CD-ROM or DVD-ROM.

The various components of information processor 6 need not be physically contained within the same chassis or even located in a single location. For example, as explained above with respect to database 10 which can reside on the storage device within information processor 6, the storage device may be located at a site which is remote from the remaining elements of information processors 6, and may even be connected to information processors 6 across data communication network 8 via the network interface.

The nature of the invention is such that one skilled in the art of writing computer executable code (software), would be able to implement the described functions using one or more popular computer programming languages such as "C++", Visual Basic, Java or HTML.

User terminals 4 are preferably equipped with web browsers software which support frames, i.e., subdividing the display into multiple display sections, to allow the user to view different types of data in each of the different subareas. For example, user terminal 4 can display a main data area showing selected information and can simultaneously display a smaller area containing an index of other functions available within the web site. As such, each user's experience with the system will be based on the order with which they progress through the system's display screens. In other words, because the system is not completely hierarchical in its arrangement of display screens, users can proceed from area to area without the need to "back-track" through a series of display screens. For that reason, the following discussion is not intended to represent any sequential steps, but rather a description of the components of the system and their operation.

Figure 2:
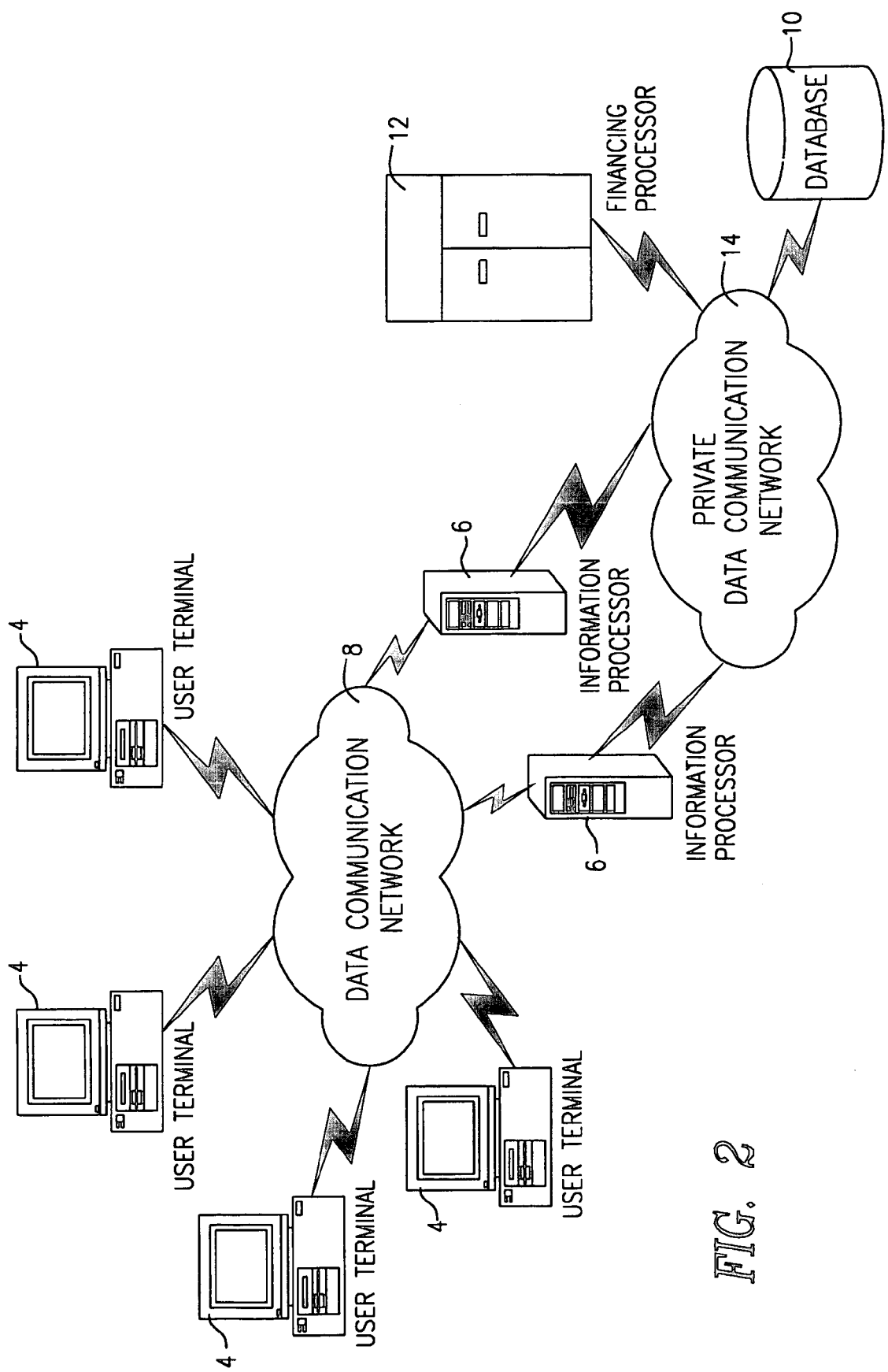
FIG. 2 is a diagram of an alternative embodiment of the hardware elements of the system of the present invention.

FIG. 2 shows a diagram of an alternate embodiment of the hardware elements of system 2 of the present invention. As shown in FIG. 2, it is contemplated that information processor 6 can be coupled to database 10 and financing processor 12 via private data communication network 14. Financing processor 12 can include its own database. Information processor 6 can be fitted with more than one network interface, or can utilize a single network interface to couple information processor 6 to private data communication network 14. The link coupling information processor 6 to private data communication network 14 can be any known networking technology including local area network (LAN) links, virtual private network (VPN) links and wide area network (WAN) links such as those used to couple information processor 6 to data communication network 8.

Database 10 is also shown in FIG. 2 as coupled to private data communication network 14. Under this arrangement, information processor 6 can store and retrieve data on database 10 such that database 10 need not be co-located with information processor 6, but instead can be located at any convenient place, both logically and physically, at which the provider of system 2 deems appropriate.

Financing processor 12 typically stores financing related information such as the vendor reserve account, customer finance, i.e., loan and lease accounts, etc in a database. Financing processor 12 can be any known computer platform including a mainframe computer, mini-computer or microcomputer running any operating system and being comprised of sufficient hardware components to meet the needs of the expected storage and processing demands to be placed thereon. In addition, it is contemplated that financing processor 12 can be a distributed system comprised of multiple processing units.

Financing processor 12 is preferably coupled to private data communication network 14 via any known networking technology, including those described above with respect to information processor 6. However, it is contemplated that financing processor 12 can be operated by an entity other than the provider of system 2 and/or can be coupled to the hardware elements of system 2 via data communication network 8.

Private data communication network 14 can be any data communication network capable of transporting data packets from financing processor 12 and database 10 to information processor 6, and vice versa. For example, it is contemplated that private data communication network 14 can be a TCP/IP network which is segregated from public data communication networks such as the Internet by existing firewall technologies.

Although the operational example described herein is described with respect to an automobile dealer financing environment, it is to be understood that the invention is not limited to such. It is contemplated that any arrangement which relies on financing, whether commercial or customer-based can be supported by the present invention. For example, the financing of commercial machinery, office equipment, etc., can be supported by the present invention.

Figure 3:
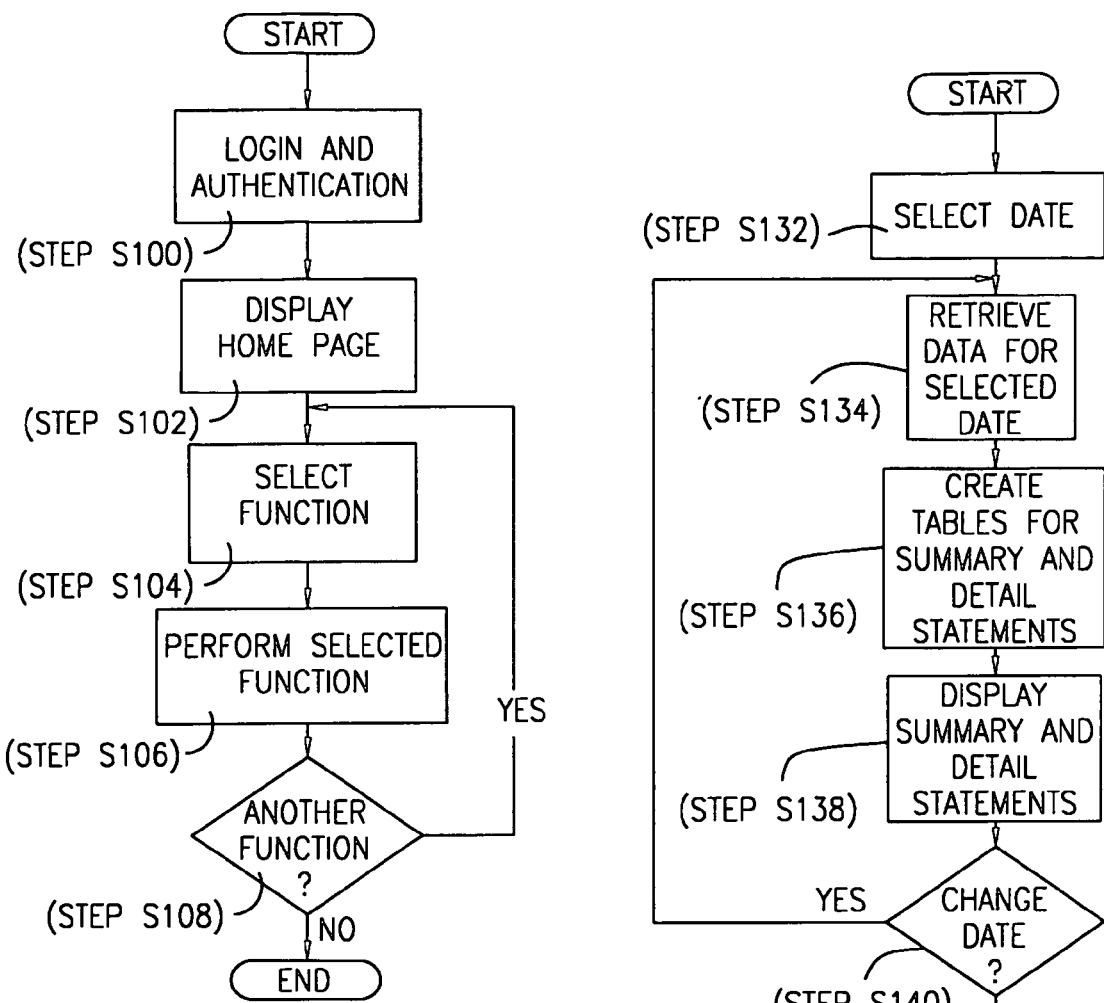
FIG. 3 is a flow chart of the overall operation of the system of the present invention.

The operation of the invention along with the accompanying exemplar screen displays is described. FIG. 3 is a flow chart of the overall operation of the system of the present invention. A user of user terminal 4 initiates their web browser or other graphical user interface software and establishes a communication session with information processor 6. The user is then preferably prompted to log in and authenticate themself (step S100). Log in and authentication are accomplished using known security methods and can also include the establishment of a secure session between user terminal 4 and information processor 6 be any known technology including secure socket layer (SSL) technology.

It is contemplated that multiple layers of user privileges are implemented within system 2. For example, a salesperson at a car dealer may have the ability to execute certain functions, while the sales manager or owner of the dealership may have still more privileges and access to functions. As another example, the sales manager may have access to reserve account data, while the salesperson may not be so privileged.

Further, it is also contemplated that users with a predetermined privilege level have the authority to create accounts for other users. For example, the sales manager may have a privilege level such that they can add salespersons as users. User ID and password authentication data is stored, for example, in database 10.

Figure 4:
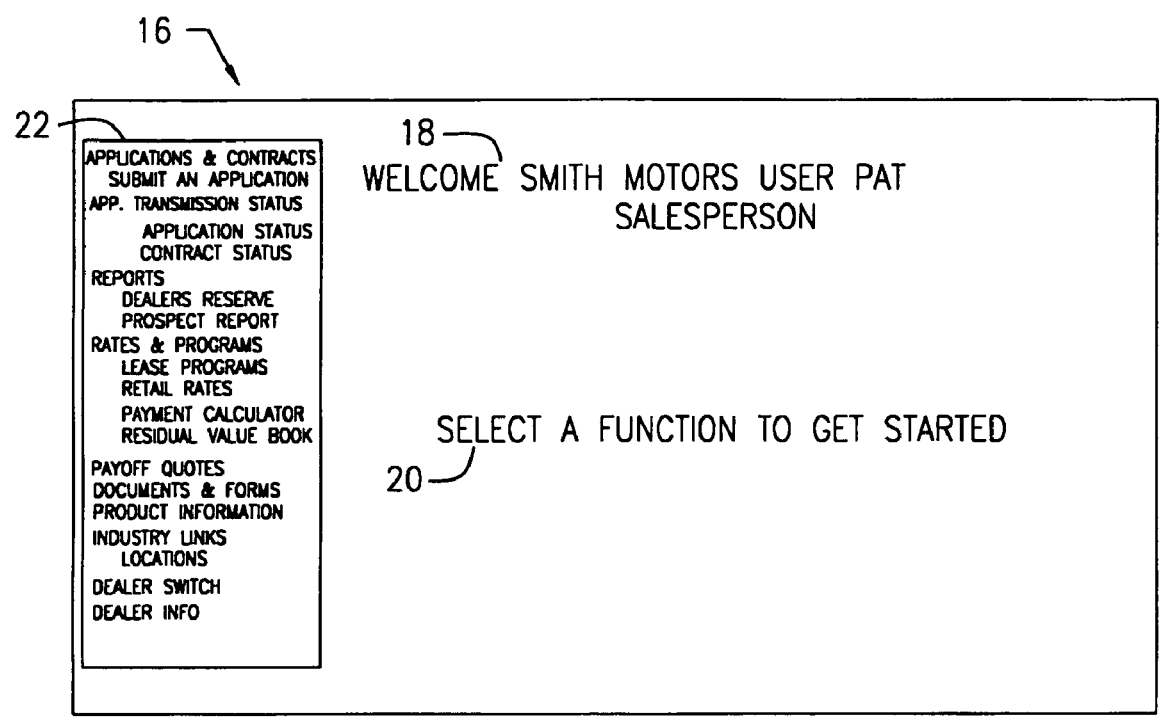
FIG. 4 is an example of a terminal display screen of a main page arranged in accordance with the principles of the present invention.

Once a user has been authenticated, information processor 6 causes the system homepage to be displayed on user terminal 4 (step S102). An example of a home, i.e., main display page is shown in FIG. 4. Main page 16 is preferably comprised of banner message 18, textual message 20 and function list 22. It is contemplated that the list of functions transmitted to user terminal 4 can be transmitted part of a Java applet or Active-X control program. Banner message 18 preferably identifies the authenticated user and their corresponding vendor. Textual message 20 can be a message, picture, and the like. Function list 22 is preferably a separate frame which lists those functions available to the user.

The user selects the function, for example, by "clicking" on it with their pointing device. Main function areas include application and contract related functions, reports, rates and programs, pay-off quotations, documents and forms, product information, industry links, locations, dealer switch and dealer information.

The application and contract functions allow a user to submit an application for financing, and check the status of the application as well as the resultant contract. As discussed above, methods for submitting and tracking financing applications via electronic networks are known. The contract status function is an aspect of the present invention as is described in detail below.

Reporting functions include reserve reports and prospect reports. The reserve reports allow a user to prepare customized reports regarding the vendor reserve account. For example, an automobile dealer may maintain a dealer reserve account with a financial institution. Prospect reports allow a user to generate reports which enable the user to target particular customers or potential customers by determining those prospective customers who may be in need of financing shortly. For example, a customer whose vehicle's lease will expire in three months may be in need of financing a new vehicle. Accordingly, the user may wish to contact the customer prior to the termination of the customer's lease.

Rates and programs functions include lease programs, retail financing rates, payment calculator and residual value book. Lease programs allow the user to quickly determine which programs are currently available to the user for particular products as well as to view an archive of prior programs such as prior lease programs. Retail rates are preferably comprised of historical loan rates and loan rates currently available to the vendors customers. Electronic payment calculators which allow a user to input rate and financing data in order to determine payments at given principal values, interest rates and terms are known. The residual value book function allows the user to access a database of values for used goods, for example, automobiles.

Similarly, systems which allow a user to determine a pay-off quotation for a customer given a number of factors, such as remaining loan principal, trade-ins, interest rates, etc., are known. The documents and forms functions allows the user access to those documents and forms stored on database 10. For example, printed copies of contracts, applications, instructions for completing those documents, contact addresses and the like may be stored as documents and forms.

The product information function provides the user with access to information pertaining to myriad financing products, for example different types of leases, loans, etc. Industry links provides the user with a list of links to other web sites which may be of use. Locations provides the user with a searchable list of financial institution locations or vendors corresponding to a particular type of good or service. For example, the location function may provide a map-based interface which allows a user to determine a particular type of automobile dealer. This may be useful, for example, when the user is not a vendor salesperson, but rather a sales person affiliated with the financial institution who seeks to sell their financing services.

The dealer switch function allows an authorized individual at a dealer group level to access information for each of the individual dealerships within the group. The dealer information function provides the user with information about the selected dealer. The dealer information function provides the dealer or the financing institution salesperson with data relating to the performance of a particular dealer by storing performance data in database 10 which can be easily retrieved and displayed on user terminal 4. Performance data includes sales volume data, loan performance data, asset quality data, loan delinquency data, etc.

Once main page 16 is displayed on user terminal 4, the user selects a desired function from function list 22 (step S104). Information processor 6 receives the request and performs the selected function (step S106), accessing database 10 and financing processor 12 as necessary. The user can continue to select functions which are transmitted to information processor 6 for performance until such time as the user has completed all desired functions (step S108). Although not shown, it is contemplated that the user can be prompted to log-out of system 2 to terminate the communication session or can just visit a different web site.

As may be necessary, database 10 is accessed to retrieve data corresponding to the function request received by information processor 6. Information processor 6 arranges the retrieved data into the desired format and transmits the data to user terminal 4 for display thereon.

Figure 5:
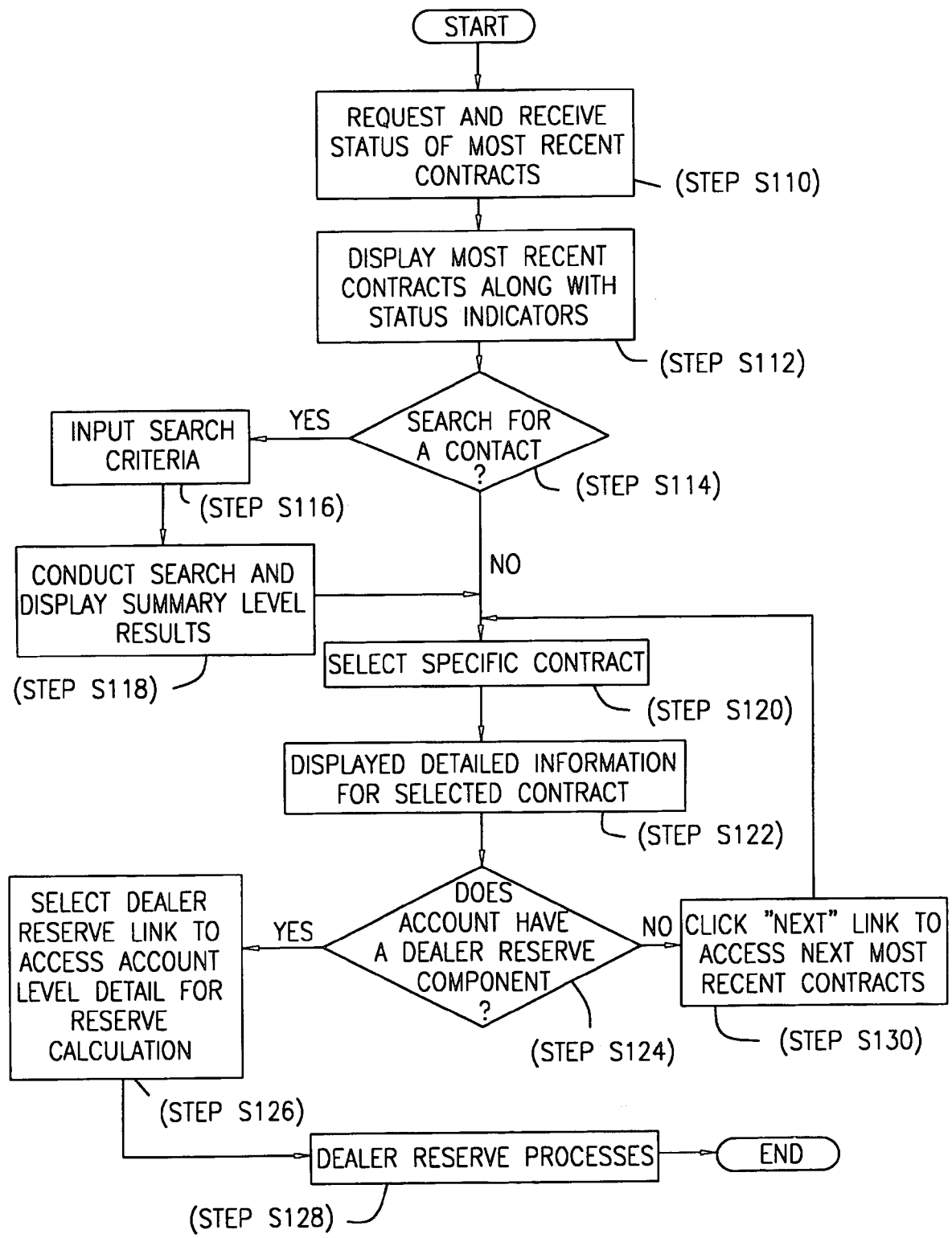
FIG. 5 is a flow chart of the contract status function of the present invention.

The contract status function of the present invention is explained with reference to FIGS. 5-7 in which FIG. 5 is a flow chart of the contract status function, FIG. 6 is an example of a contract summary display screen and FIG. 7 is an example of a detailed contract display screen. Referring to FIG. 5, a user initially selects the contract status function from function list 22. Information processor 6 receives this request and retrieves the status of the most recent contracts for the corresponding vendor from database 10 (step S110). The present invention can also be arranged to retrieve the status of all contracts for the corresponding vendor. The data retrieved by information processor 6 is preferably summary data. It is contemplated that the quantity of contracts received during this initial process can be set to a convenient number, for example 10 contracts.

The summary contract data is received by user terminal 4 and displayed (step S112). As shown in FIG. 6, contract summary display screen 24 includes contract summary area 26. Contract summary display screen 24 also includes search area 28, printable format button 30 and download to spreadsheet button 32. As discussed below, search area 28 allows a user to search for a particular contract by entering search criteria and selecting a search category.

Contract summary area 26 provides a convenient way to display contract summary data. Contract summary data includes the date that the contract was received by the financing institution, a unique reference number corresponding to the contract the Applicant's first and last names the product category, contract status, book date and time. N/U/D refers to whether the product is new, used or a demo. Products include retail loan, balloon-type loan or lease. Contract status indicators include whether the contract documents have been received by the financing institution, that the contract is pending, and whether the contract. i.e., financing has been booked by the financing institution. In the case where the contract has been booked, the booked date and time appear in contract summary area 26.

In addition, the summary data displayed in contract summary area 26 can be sorted by selecting the category title. For example, selecting the "reference number" category will sort the summary contract data by reference number. Although the data can be sorted directly by the Java applet Active-X control downloaded to user terminal 4, it is also contemplated that selecting the category indicates to information processor 6 that the user is requesting a data sort on the contract summary data. Any function for which a data sort is useful is preferably implemented in this manner.

Selecting printable format button 30 causes a version of the contract summary data to be displayed which provides a display suitable for printing, i.e., without the banners, function list 22, etc., preferably by opening up a new browser window. Selecting download to spreadsheet button 32 initiates a file transfer function which retrieves the contract summary, and optionally detail data, from information processor 6. In the alternative, it is also contemplated that the contract summary data which is already present on user terminal 4 can be reformatted and directly saved in the storage device of user terminal 4.

The user can also search for a contract (step S114) by inputting search criteria in search area 28 (step S116). Search categories preferably include the contract summary display categories, customer's social security number and month the contract was received by the financing institution.

By selecting the appropriate button, for example a submit button, the search parameters are transmitted to information processor 6 which uses known searching techniques to initiate a search in financing processor 12 or search database 10 for contract records which meet the input search criteria. The resultant summary contract data is transmitted to user terminal 4 for display in contract summary area 26 (step S118).

In the case where the user does not wish to search for a contract or when the search results show a contract for which the user desires more information, the user can select the specific contract, for example by selecting the corresponding reference number of the contract in contract summary area 26 (step S120). The request, preferably including the reference number or other identifying indicator, is transmitted to information processor 6 which retrieves the corresponding detailed contract data from database 10 and transmits the detailed contract data to user terminal 4 for display (step S122).

An example of contract status details for a retail loan is shown in FIG. 7 as detail contract display screen 34. It should be noted that detail contract display screens for other loan types may result in the presentation of different detailed information and fields. For example, detail contract display screen 34 shows financing information related to a traditional vehicle loan. This information may be different in the case of a lease or for a different type of product.

As shown in FIG. 7, detail contract display screen 34 is comprised of three main areas (not including function list 22), namely applicant, i.e., customer information area, vehicle, i.e., product information area 38 and financing information 40. Customer information area 36 includes detailed information about the applicant. Product information area 38 includes relevant information about the product to be financed, for example, particular information about the vehicle. Financing information area 40 contains relevant details regarding the financing, for example the amount financed, financing terms, customer and vendor interest rates, bonuses gap payments, etc. It is also contemplated that information regarding the financing company representative can be included as part of the detailed contract data, for example the account representative's name, telephone number, company, etc.

In the case where the vendor has a reserve component associated with the contract (step S124), detail contract display screen 34 includes a link which, when selected (step S126), initiates the corresponding reserve function which will calculate the vendor's reserve activity corresponding to the contract (link not shown in FIG. 7) (step S128). Where the vendor account does not have a reserve component corresponding to the contract, the user can select a link which causes the next most recent group of contracts to be displayed on contract summary display screen 24 (step S130).

Figure 8:
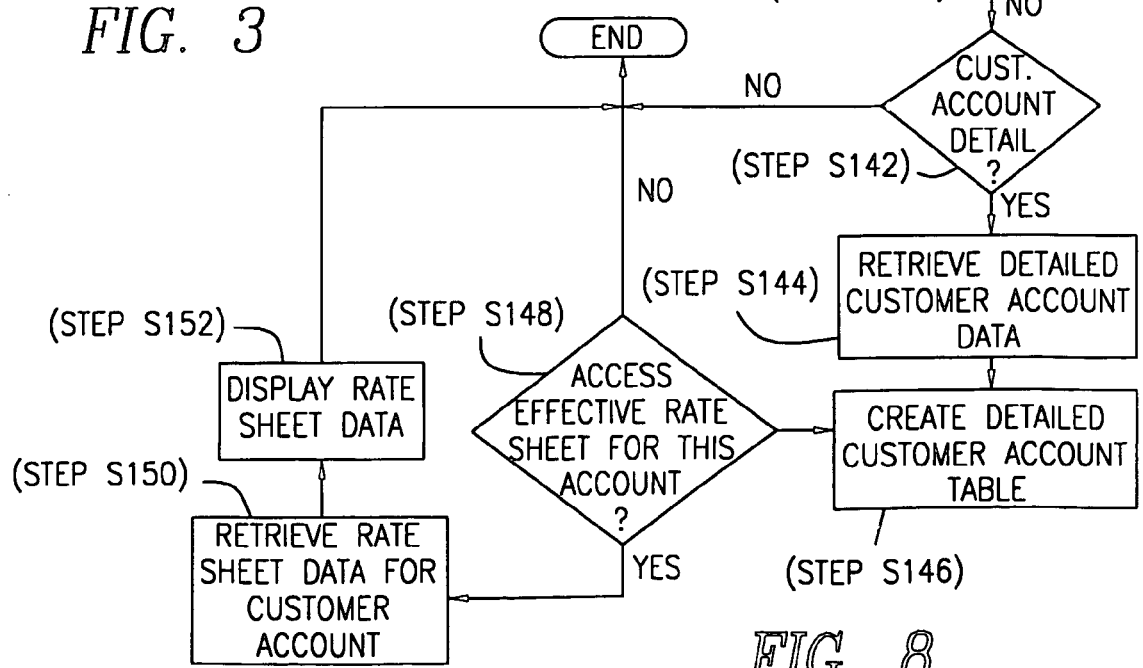
FIG. 8 is a flow chart of the reserve report function of the present invention.

The present invention provides a plurality of report functions, two of which are the reserve report function and prospect report function. The reserve report function is described with reference to FIGS. 8-10 in which FIG. 8 is a flow chart of the reserve report function, FIG. 9 is an example of a vendor reserve account summary display screen and FIG. 10 is an example of a reserve detail display screen.

Upon selecting the reserve report function from function list 22, information processor 6 retrieves reserve account data from database 10 for the corresponding vendor in accordance with a date selected automatically by information processor 6 or by the user (step S132). The reserve account data includes reserve account summary data and reserve account transaction detail data. For example, information processor 6 is preferably arranged to retrieve reserve data corresponding to the current month (step S134). The retrieved reserve data is assembled into a summary table and a transaction detail table, preferably HTML-based tables, using web server software executing on information processor 6 (step S136). The tables are preferably transmitted as a data stream, for example using HTTP, to user terminal 4 and displayed thereon (step S138).

As shown in FIG. 9, summary reserve display screen 42 includes date entry area 44, transaction summary area 46 and transaction detail area 48. Date entry area 44 allows the user to select a different date range for the reserve summary data. The date range is entered by clicking the submit button. Changing the date causes information processor 6 to retrieve summary reserve data for the entered date range and transmit this data to user terminal 4.

Transaction summary area 46 is comprised of summary reserve data which provides an overview of the reserve account activity. The summary reserve data includes reserve calculation data such as the starting and current reserve balances, net up front and earned credits and the net of checks for electronic funds transfers. The reserve adjustment data includes net adjustments and charge backs. Transaction summary area 46 also provides other summary information data including the net amount of new loans, repossessions, charge-offs and payoffs, the total of all loan balances along with the accumulated hold back and required hold back, if any.

Transaction detail area 48 provides more comprehensive information beyond what is shown in transaction summary area 46. Transaction detail area 48 includes the reserve account transaction detail data and shows, for example, the comprehensive information for each transaction which occurred during the designated time period. Transaction details include, for example, the date of the transaction, the corresponding customer's account number and name, the funding date, i.e., date of the initial financing, a transaction code which identifies the type of transaction, description of the transaction, the amount of the transaction and whether the transaction is a debit or a credit. Other details supporting a particular transaction can be included, depending on the nature of the transaction.

Referring again to FIG. 8, the user can continue to review reserve statements for different periods by selecting a different date in date entry area 44 (step S140). The user can also receive customer account details (step S142) by selecting the appropriate transaction from transaction detail area 48 as shown in FIG. 9.

Selecting a particular transaction instructs information processor 6 to retrieve detailed customer account data from database 10 (step S144) and to create a detailed account table, for example, in HTML format, for display on user terminal 4. FIG. 10 shows customer account detail display screen 50, displayed on user terminal 4 upon selection of a particular transaction from transaction detail area 48. Customer account detail display screen 50 displays the selected detailed customer data, including reserve component data 52. Reserve component data represents amounts credited or debited to the vendors account associated with the customer's financing.

Customer account detail screen 50 also includes customer contract/application information area 54 and financing information area 56. The buy rate as shown in financing information area 56 refers to the rate interest rate corresponding to the vendor, and the customer rate refers to the actual interest rate being charged to the customer. Additional data fields in financing information area 56 preferably include a coupon, i.e., discount amount, adjustments.

The combination of summary reserve display screen 42 and customer account detail screen 50 allows a user to quickly retrieve information regarding the corresponding vendor's reserve account and to determine which customers are positively contributing to the reserve account which are adversely affecting the reserve account. This allows the vendor to be better able to market their products by understanding how customers affect their business.

Although not shown in FIG. 10, the user is preferably provided with a link allowing the user access to the effective rate sheet associated with the customer's account (step S148). Upon selection, user terminal 4 transmits a request to information processor 6 which retrieves rate sheet data corresponding to the customer from database 10, and optionally the vendor, account (step S150) and transmits the rate sheet data to user terminal 4 for display (step S152).

The effective rate sheet for the corresponding customer account retrieved from database 10 displays the rate sheet that was used to determine the buy rate for the corresponding customer account.

The present invention also provides prospect reports to users, allowing users an efficient yet comprehensive avenue for locating prospecting customers, especially customers who have had prior dealings with the vendor. The prospect report function is described with reference to FIGS. 11-13 in which FIG. 11 is a flow chart of the prospect report function, FIG. 12 is an example of a prospect report summary display screen, and FIG. 13 is an example of a detailed prospect report display screen.

In particular, the prospect report function provides vendors and their corresponding users with a list of customers, i.e., prospects, whose leases, balloon and retail loans, will mature in a time frame selected automatically by the system or selected by the user.

The summary and detailed reports provide sales leads to vendors by providing details of their customers' accounts which are maturing in the near future. Upon selecting the prospect report function from function list 22, user terminal 4 notifies information processor 6 of the selection.

Figure 11:
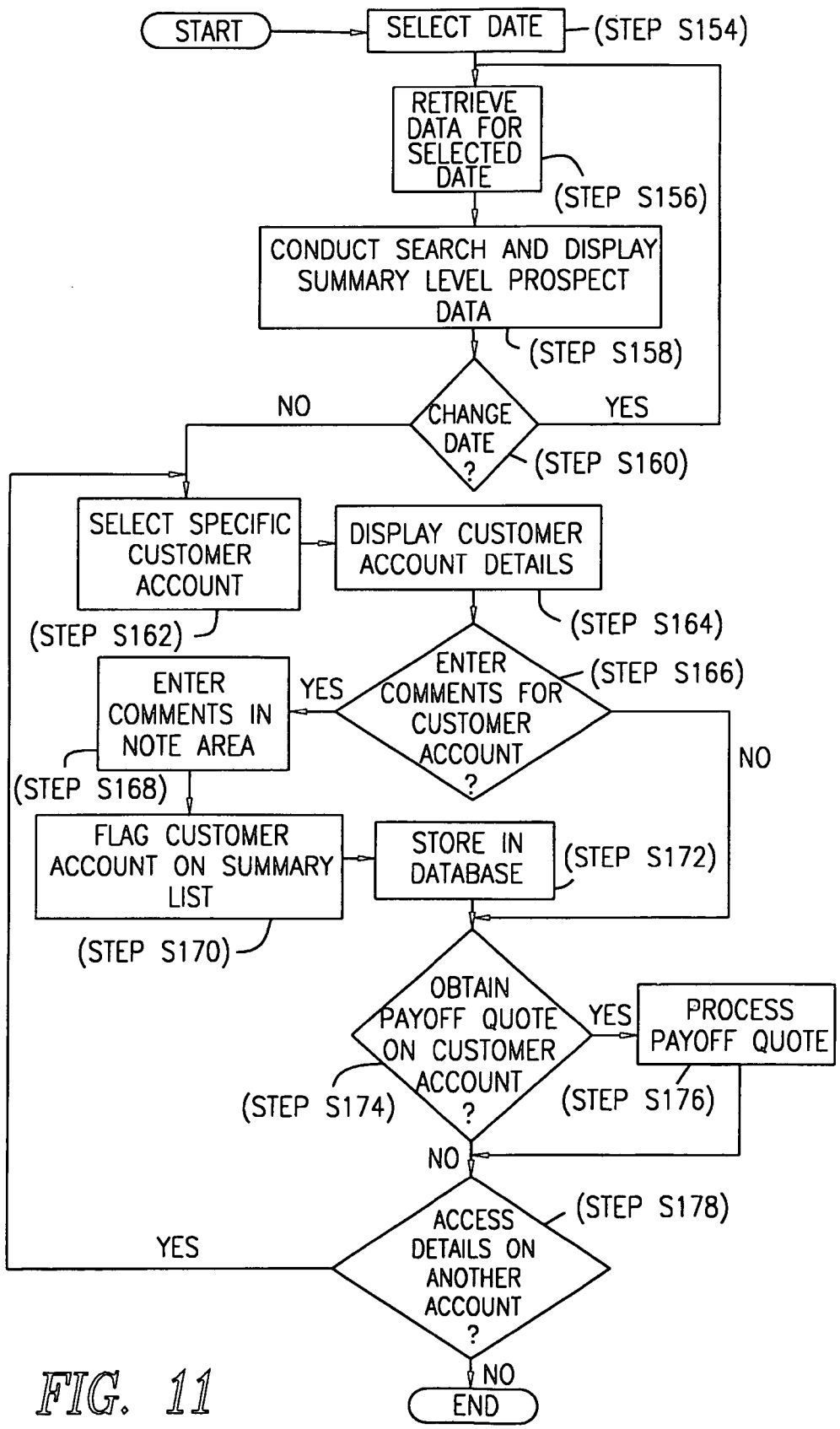
FIG. 11 is a flow chart of the prospect report function of the present invention.

Referring to FIG. 11, information processor 11 determines a date range for which prospect data is to be retrieved (step S154) and retrieves the corresponding summary level prospect data for the selected date range. The summary level prospect data is transmitted to user terminal 4 and displayed (step 158). A date range can be automatically determined by information processor 6, for example, accounts maturing within the next month. It is also contemplated that a predetermined number of maturing accounts can be retrieved and displayed in date order, for example, the first twenty maturing accounts.

As shown in FIG. 12, summary of prospect display screen 58 preferably includes date entry area 60, summary prospect data area 62, printable format button 30 and download to spreadsheet button 32.

The operation of date entry area 60 is similar to that of date entry area 44 corresponding to the reserve function.

Summary prospect data area 62 is comprised of summary prospect data which identifies a customer, maturity date of their account and any notes accompanying the summary of prospect data record. Summary prospect display screen 58 provides the user with a quick and efficient way to determine prospective customers; customers who represent real sales leads by virtue of their maturing accounts.

Referring again to FIG. 11, the user can, as described above, change the date range for which the prospect is generated (step 160) in which case information processor 6 retrieves the corresponding summary level prospect data from database 10, repeating steps 156 and 158. The user selects a respective customer from summary prospect data area 62 to request detailed prospect information for that customer (step 162). The request is transmitted to information processor 6 which queries database 10 to retrieve detailed prospect data for the selected customer which is transmitted to and displayed on user terminal 4 (step S164).

As shown in FIG. 13, detailed prospect display screen 64 includes customer information area 66, financed product area 68, detailed prospect account information area 70 and notes entry area 72. Areas 66-72 represent detailed prospect data corresponding to the selected customer displayed in summary prospect data area 62.

Customer information area 66 displays data relating to customer contact, including the customer's name, address and telephone number. It is also contemplated that customer information area 66 can include the customer's electronic mail address. Financed product information area 68 includes particularized data regarding the product currently being financed. FIG. 13 shows an example of a financed vehicle in financed product information area 68.

Detailed prospect account information area displays data corresponding to the customer's account for the financed product. Detailed prospect account information area preferably includes an account number, product type, maturity date of the account, the customer's monthly payment, the most recent payoff quotation and the date that the payoff quotation is valid through. It is contemplated that information processor 6 can process the payoff quotation and validity date prior to transmitting the detailed prospect data to user terminal 4, such that the payoff quotation and validity date are current at the time the data are delivered to user terminal 4. It is further contemplated that the processing capability of information processor 6 as well as the ability for database 10 to retrieve and deliver (or make available) the data to information processor 6 may necessitate retrieving a payoff quotation and validity date which was previously calculated and stored in database 10 as part of the detailed prospect data, for example, during a periodic or prior calculation process.

In the latter case, detailed prospect display screen 64 also includes get payoff quote link 74. Selecting get payoff quote link 74 initiates a separate process within information processor 6 which calculates a current payoff quotation and transmits the quotation for display on user terminal 4 (display example not shown). Providing a separate link to initiate payoff quotation calculations conserves processing resources by not unnecessarily calculating payoffs.

Note entry area 72 allows the user to enter comments which are stored with the corresponding detailed prospect data in database 10. This allows the user, for example, to record details of any communication with the respective customer. The user indicates that they want to store the data in database 10 by selecting save notes button 76. Selecting clear notes entry area button 78 deletes the entry in notes entry area 72, allowing the user to reenter their comments or delete any previous comments. Selecting next prospect button 80 causes information processor 6 to transmit detailed prospect data for the next prospect in summary of prospect data area 62.

Referring to FIG. 11, the interactive flow between the user and the display in FIG. 13 is described as follows. If the user wishes to enter comments in notes entry area 72 (step S166), the user enters these comments in note entry area 72 (step S168) and selects save notes button 76. The user's detailed prospect data record is flagged (step S170), preferably by information processor 6, to indicate that comments have been entered for that prospective customer and stored in database 10 (step S172). This flag is indicated in summary prospect data area 62 under the notes column, thereby informing the user of the existence of notes for the corresponding customer.

Where the user does not wish to enter comments for the customer, or once the flag indicator has been set in step S172, the user indicates that they would like to obtain a current payoff quotation by selecting get payoff link 74 (step S174). When such an indication is received by information processor 6, the payoff quotation is processed (step S176) by information processor 6. It should be noted that, as discussed above, information processor 6 need not actually perform the calculation, but rather any processor which can be accessed by information processor can complete the calculation, for example, financing processor 12.

It should be noted that, although comment entry for customer account shown in step 166 appears prior to payoff quotation step S174 in FIG. 11, the nature of a web browser or web graphical user interface display such as shown in detailed prospect display screen 64 allows the steps to be requested and executed in any order. As such, the presentation order of the steps in FIG. 11 is provided merely for convenience of explanation and can be requested and completed in any sequence.

The user continues to interact with display screens 58 and 64 to access details for other accounts (step S178). For example, the user can select next prospect button 80 on detailed prospect display screen 64 or can display summary of prospect display screen 58 to initiate additional searches or select other customers from summary of prospect data area 62.

Figure 14:
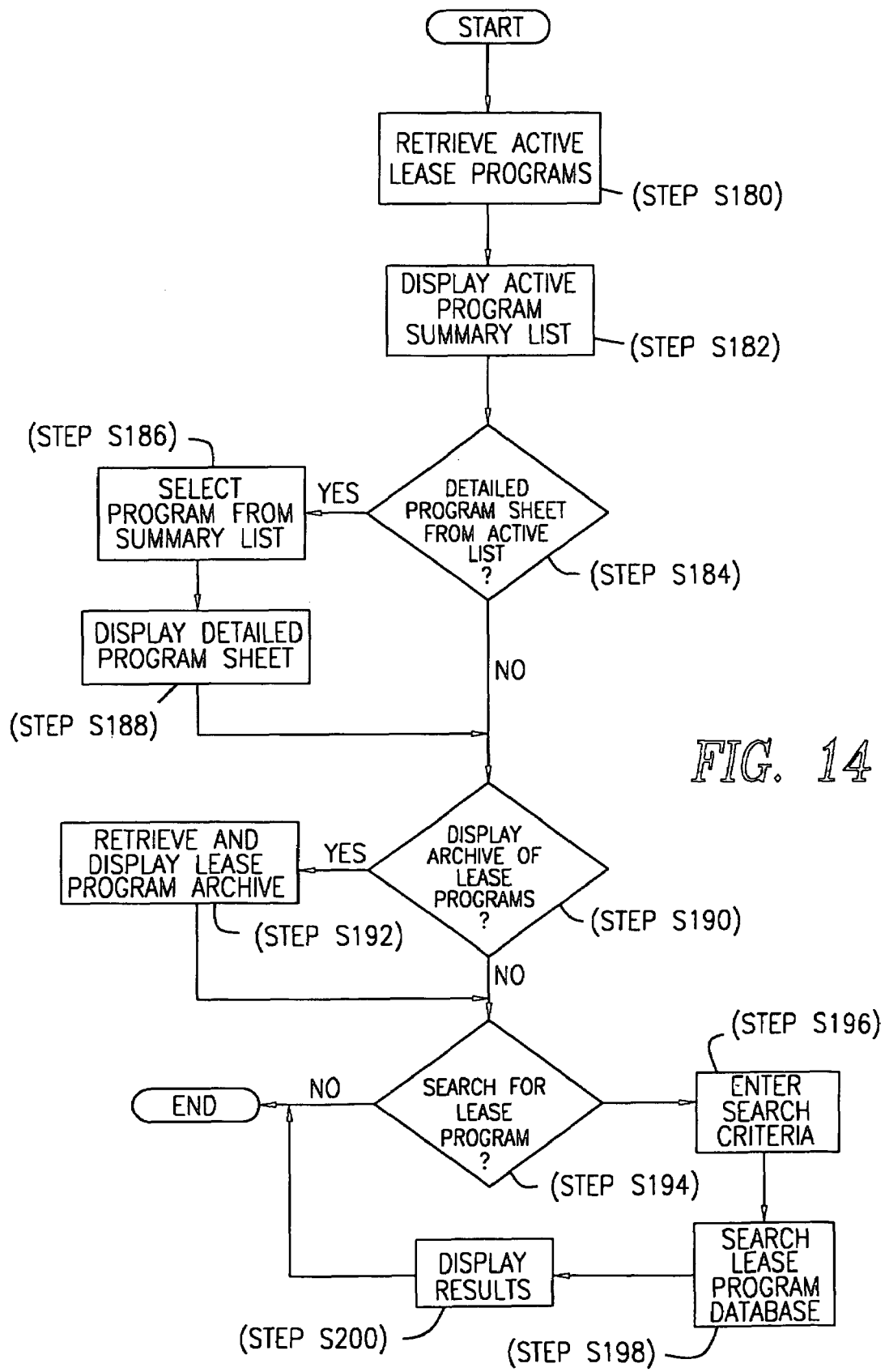
FIG. 14 is a flow chart showing the lease programs function of the present invention.

Advantageously, the present invention also allows users to access financing rate sheets which provide users with lease, retail (loan) and balloon rates currently in effect along with archives of previous rates. The program rates functions selected from function list 22 are described with reference to FIGS. 14-16 in which FIG. 14 is a flow chart showing the lease programs function, FIG. 15 is an example of a lease program summary display screen and FIG. 16 is an example of a display screen of lease program details. It should be noted that, although the described example refers to lease program, similar interactivity and display screens are used for the retail rate function.

Referring to FIG. 14, a user selecting the lease program function from function list 22 initiates a process in which information processor 6 retrieves current lease program summary data from database 10 (step S180) which is transmitted to user terminal 4 and displayed (step S182).

FIG. 15 shows current lease summary display screen 82. Current lease summary display screen 82 includes lease program search area 84, current lease program summary area 86 and historical lease program button 88. Lease program search area 84 allows a user to search for current and historical lease program data by completing appropriate fields and selecting search criteria in a manner similar to the search functions described above.

Current lease program summary area 86 is comprised of current lease program summary data. The current lease program summary data identifies those lease programs which are available to the user. For example, as shown in FIG. 15, current lease program summary area 86 includes the lease program title, a program identification number, the start and end dates of the program, and the date by which financing must be funded.

Historical lease programs button 88 provides a user with archival lease program data corresponding to programs which have ended. This allows the user to view lease and financing trends, better enabling the user to market leases and lease programs to prospective customers.

Referring again to FIG. 14, a user who wants to view detailed lease program information (step S184) selects the desired lease program from current lease summary program area 86 (step S186). The request is sent to information processor 6 which retrieves the current lease program detail data from database 10 and transmits the data to user terminal 4 for display (step S188). The data is preferably formatted into a table for easy viewing either by information processor 6 via appropriate HTML instructions or formatted by a java or Active-X program on user terminal 4.

As shown in FIG. 16, current detailed lease program display 90 provides user with a clear display of current lease program detailed data which identifies lease programs and their corresponding rates currently available to the user to offer prospective customers. Current detailed lease program display 90 includes lease term data, manufacturer's suggested retail price (sticker price) data, the selling price corresponding to the lease, and the acquisition fee. In addition, it is contemplated that detailed rate information can be provided for a number of different models simultaneously for a given manufacturer.

As discussed above, a user can search for a particular lease program (step S198). The search results are displayed on user terminal 4 in current lease program summary area 86 (step S200).

A user wishing to view historical lease program data (step S190) selects historical lease programs button 88 as shown on FIG. 15 or a similar button on current detailed lease program display screen 90 (not shown). Information processor 6 receives this request, retrieves historical lease program data from database 10, and transmits the data to user terminal 4 for display (step S192). The archival lease program data includes term and rate information for various products. It is further contemplated that the program archive database can be searched using an appropriate search tool and search entry areas.

It should be noted that detailed program sheet selection (step 184), display archive of lease programs (step 190) and search for lease program (step 194) can be performed in any order.

Further, it is contemplated that the use of a multi-dimensional database and web browser access provides the user with the ability to customize their queries and reports, save these reports for future use and "publishing" to other users. This allows, for example, a user associated with one vendor to create queries and make these queries available to other users affiliated with the same vendor. For example, referring to FIG. 13, it is contemplated that the user can be presented with a template corresponding to available database fields relating to prospect report data. Using known software applications, the user can arrange the template to provide the precise fields and arrangement desired. For example, financed product information area 68 might include additional information related to the vehicle, for example, the miles on the lease, recent known mileage, if and when the vehicle was in for service, and the like. Detailed prospect account information area 70 might be placed on a different spot on detailed prospect display screen 64 and might be arranged to include additional account information, such as the original salesperson, contact date, etc. In sum, any information which the user deems appropriate can be used.

Further, it is contemplated that any display screen whether detailed or a summary screen can be customized by a user and made available to other users.

The present invention provides a comprehensive method and system which allows a user representing a vendor to determine contract status, request summary and detailed reports regarding the vendor's reserve account and prospective customers, access and view financing program data, along with other functions which allow a vendor to minimize costs associated with financing activities while simultaneously allowing the vendor to generate and maximize financing-related revenue.

The present invention preferably provides these functions through the use of a web browser. The web browser display data, in combination with Java applets and control programs Active-X controls, are transmitted to the user terminal by the information processor, thereby obviating the need for the user terminal to be equipped with special software or hardware. In addition, the use of a multidimensional database analyzed using OLAP tools provides flexibility and the ability to quickly access and format data to accommodate the user's inquiries.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for using a communication network to facilitate financing-related activities, the method comprising the acts of:
   providing a list of financing functions to a user terminal across the communication network, the list of financing functions corresponding to those functions available to a user of the user terminal, the financing functions including at least one of a status function, a report generation function and a least one financing program function;
   receiving a financing function request from the user terminal, the financing function request corresponding to a selected one of the financing functions provided to the user terminal;

receiving data corresponding to the received financing function request from a database by accessing the database;

arranging the received data into a predetermined format;

transmitting the formatted data across the communication network to the user terminal;

displaying summary contract data corresponding to at least one contract;

receiving a request to display detailed contact data for a selected one of the at least one contract; and displaying detailed contract data, the detailed contract data corresponding to the requested one of the at least one contract;

wherein the status function is a contract status function and the received data includes at least one of summary contract data and detailed contract data and wherein the summary contract data and the detailed contract data each include: contract receipt date; contract status; and contract booking data.

2. The method according to claim 1, wherein the formatted data is in the form of an electronic screen.

3. The method according to claim 1, wherein the database is a multidimensional database.

4. The method according to claim 1, wherein the predetermined format is created by the user.

5. The method according to claim 4, wherein the predetermined format is made available to other users.

6. The method according to claim 1, wherein the list of functions is provided to the user as part of at least one of a Java applet or Active-X control program.

7. The method according to claim 1, wherein the detailed contract data further includes:
vehicle data, the vehicle data corresponding to a vehicle for which the contract is being made; and
financing information, the financing data corresponding to the type of financing being sought by a purchaser of the vehicle.

8. The method according to claim 1, further comprising the act of providing the user with the ability to electronically request reserve data for an account corresponding to the user.

9. The method according to claim 1, wherein the report generation function is a reserve report function and the received data includes at least one of summary reserve data, detailed reserve data and customer account data.

10. The method according to claim 9, wherein the summary reserve data corresponds to a time period, the summary reserve data comprising:
reserve calculation data; and
reserve adjustment data.

11. The method according to claim 9, wherein the detailed reserve data corresponds to a time period, the detailed reserve data comprising transaction details for a corresponding reserve account.

12. The method according to claim 9, further comprising the acts of:
determining a time period;
displaying summary and detailed reserve data for the determined time period;
receiving a request to display selected customer account data; and
displaying the selected customer account data.

13. The method according to claim 1, wherein the report generation function is a prospect report generation function, the prospect report generation function providing the user with a list of customers whose financing is scheduled to terminate within a predetermined period of time, the received data including at least one of summary prospect data and detailed prospect data.

14. The method according to claim 13, wherein the summary prospect data corresponds to a time period, the summary prospect data including:
a customer name; and
a maturity date.

15. The method according to claim 13, wherein the detailed prospect data includes:
customer data;
a maturity date; and
a payoff amount.

16. The method according to claim 13, further comprising the acts of:
determining a time period;
displaying summary prospect data for the determined time period, the summary prospect data corresponding to prospective customers;
receiving a request to display detailed prospect data for a selected one of the prospective customers; and
displaying detailed prospect data, the detailed prospect data corresponding to the selected one of the prospective customers.

17. The method according to claim 16, further including the acts of:
receiving comments from the user terminal for the selected prospective customer; and
storing the comments in the database.

18. The method according to claim 16, further including the acts of:
receiving a request for a payoff quote for the selected prospective customer;
determining the payoff quote for the selected prospective customer; and
displaying the payoff quote.

19. The method according to claim 1, wherein the financing program function is a program function for at least one of a lease program and loan program, the received data comprising at least one of current program summary data, current program detail data and archival program data, the current program summary data identifying programs currently available to the user, the current program detail data identifying programs and corresponding lease rates currently available to the user, the archival program data corresponding to archival data of previous programs and lease rates.

20. The method according to claim 19, further comprising the acts of:
displaying current program summary data for currently available programs;
receiving a request to display current program detail data for a selected one of the currently available programs; and
displaying current program detail data, the current program detail data corresponding to the selected one of the currently available programs.

21. The method according to claim 20, further comprising the acts of:
receiving a request to display archival program data; and
displaying the archival program data.

22. The method according to claim 1, wherein the financing program functions further include a dealer performance reporting function, the received data comprising dealer performance reporting data.

23. The method according to claim 22, wherein the dealer performance reporting data includes:

sales volumes;
efficiency levels;
asset quality; and
delinquency data.

24. A system which uses a communication network to facilitate financing activities, the system comprising:
a database;
an information processor coupled to the database, the information processor including:
a network interface coupling the information processor to the communication network;
a central processing unit, the central processing unit accepting requests from a user terminal coupled to the communication network, the central processing unit executing functions including:
receiving from the user terminal, a selected financing function request, the selected financing function request corresponding to a financing function selected from a list of financing functions made available to a user of the user terminal, the list of financing functions including at least one of a status function, a report generation function and a financing program function;
receiving data corresponding to the received financing function request from the database by accessing the database;
arranging the received data into a predetermined format;
using the network interface to transmit the formatted data to the user terminal;
displaying summary contract data corresponding to at least one contract;
receiving a request to display detailed contact data for a selected one of the at least one contract;
displaying detailed contract data, the detailed contract data corresponding to the requested one of the at least one contract; and
wherein the status function is a contract status function and the received data includes at least one of summary contract data and detailed contract data and wherein the summary contract data and the detailed contract data each include: contract receipt date; contract status; and contract booking data.

25. The system according to claim 24, further comprising a financing processor, the financing processor being coupled to the information processor, the financing processor comprising data corresponding to financial accounts associated with users of the system.

26. The system according to claim 25, wherein the data includes reserve data.

27. The system according to claim 25, wherein the financing processor is coupled to the information processor through another communication network.

28. The system according to claim 24, wherein the formatted data is in the form of an electronic screen.

29. The system according to claim 24, wherein the database is a multidimensional database.

30. The system according to claim 24, wherein the predetermined format is created by the user.

31. The system according to claim 30, wherein the predetermined format is made available to other users.

32. The system according to claim 24, wherein the central processing unit further executes the function of transmitting the list of functions to the user terminal as part of at least one of a Java applet or Active-X control program.

33. The system according to claim 24, wherein the detailed contract data further includes:
vehicle data, the vehicle data corresponding to a vehicle for which the contract is being made; and
financing information, the financing data corresponding to the type of financing being sought by a purchaser of the vehicle.

34. The system according to claim 24, further comprising the act of providing the user with the ability to electronically request reserve data for an account corresponding to the user.

35. The system according to claim 24, wherein the report generation function is a reserve report function and the received data includes at least one of summary reserve data, detailed reserve data and customer account data.

36. The system according to claim 35, wherein the summary reserve data corresponds to a time period, the summary reserve data comprising:
reserve calculation data; and
reserve adjustment data.

37. The system according to claim 35, wherein the detailed reserve data corresponds to a time period, the detailed reserve data comprising transaction details for a corresponding reserve account.

38. The system according to claim 35, wherein the central processing unit executes the further functions of:
determining a time period;
displaying summary and detailed reserve data for the determined time period;
receiving a request to display selected customer account data; and
displaying the selected detailed customer data.

39. The system according to claim 24, wherein the report generation function is a prospect report generation function, the prospect report generation function providing the user with a list of customers whose financing is scheduled to terminate within a predetermined period of time, the received data including at least one of summary prospect data and detailed prospect data.

40. The system according to claim 39, wherein the summary prospect data corresponds to a time period, the summary prospect data including:
a customer name; and
a maturity date.

41. The system according to claim 39, wherein the detailed prospect data includes:
customer data;
a maturity date; and
a payoff amount.

42. The system according to claim 39, wherein the central processing unit executes the further functions of:
determining a time period;
displaying summary prospect data for the determined time period, the summary prospect data corresponding to prospective customers;
receiving a request to display detailed prospect data for a selected one of the prospective customers; and
displaying detailed prospect data, the detailed prospect data corresponding to the selected one of the prospective customers.

43. The system according to claim 42, wherein the central processing unit executes the further functions of:
receiving comments from the user terminal for the selected prospective customer; and
storing the comments in the database.

44. The system according to claim 42, wherein the central processing unit executes the further functions of:
receiving a request for a payoff quote for the selected prospective customer;

determining the payoff quote for the selected prospective customer; and displaying the payoff quote.

45. The system according to claim 24, wherein the financing program function is a program function, the received data comprising at least one of current program summary data, current program detail data and archival program data, the current program summary data identifying programs currently available to the user, the current program detail data identifying programs and corresponding lease rates currently available to the user, the archival program data corresponding to archival data of previous programs and lease rates.

46. The system according to claim 45, wherein the central processing unit executes the further functions of:

displaying current program summary data for currently available programs;

receiving a request to display current program detail data for a selected one of the currently available programs; and displaying current program detail data, the current program detail data corresponding to the selected one of the currently available programs.

47. The system according to claim 46, wherein the central processing unit executes the further functions of:

receiving a request to display archival program data; and displaying the archival program data.

48. The system according to claim 24, wherein the financing program functions further include a dealer performance reporting function, the received data comprising dealer performance reporting data.

49. The system according to claim 48, wherein the dealer performance reporting data includes:

sales volumes;

efficiency levels;

asset quality; and delinquency data.

50. A storage medium storing programmatic code for a network-based financing information system which, when executed, performs acts comprising:

receiving from a user terminal, a requested financing function request, the requested financing function request corresponding to a financing function selected from a list of financing functions made available to a user of the user terminal, the list of financing functions including at least one of a status function, a report generation function and a financing program function;

receiving data corresponding to the received financing function request from a database by accessing the database;

arranging the received data into a predetermined format;

transmitting the formatted data across the communication network to the user terminal;

displaying summary contract data corresponding to at least one contract;

receiving a request to display detailed contact data for a selected one of the at least one contract; and displaying detailed contract data, the detailed contract data corresponding to the requested one of the at least one contract;

wherein the status function is a contract status function and the received data includes at least one of summary contract data and detailed contract data and wherein the summary contract data and the detailed contract data each include: contract receipt date; contract status; and contract booking data.

51. The storage medium according to claim 50, wherein the formatted data is in the form of an electronic screen.

52. The storage medium according to claim 50, wherein the database is a multidimensional database.

53. The storage medium according to claim 50, wherein the predetermined format is created by the user.

54. The storage medium according to claim 53, wherein the predetermined format is made available to other users.

55. The storage medium according to claim 50, further comprising the act of transmitting the list of functions to the user as part of at least one of a Java applet or Active-X control program.

56. The storage medium according to claim 50, wherein the detailed contract data further includes:

vehicle data, the vehicle data corresponding to a vehicle for which the contract is being made; and financing information, the financing data corresponding to the type of financing being sought by a purchaser of the vehicle.

57. The storage medium according to claim 50, further comprising the act of providing the user with the ability to electronically request reserve data for an account corresponding to the user.

58. The storage medium according to claim 50, wherein the report generation function is a reserve report function and the received data includes at least one of summary reserve data, detailed reserve data and customer account data.

59. The storage medium according to claim 58, wherein the summary reserve data corresponds to a time period, the summary reserve data comprising:

reserve calculation data; and reserve adjustment data.

60. The storage medium according to claim 58, wherein the detailed reserve data corresponds to a time period, the detailed reserve data comprising transaction details for a corresponding reserve account.

61. The storage medium according to claim 58, further comprising the acts of:

determining a time period;

displaying summary and detailed reserve data for the determined time period;

receiving a request to display selected customer account data; and displaying the selected detailed customer data.

62. The storage medium according to claim 50, wherein the report generation function is a prospect report generation function, the prospect report generation function providing the user with a list of customers whose financing is scheduled to terminate within a predetermined period of time, the received data including at least one of summary prospect data and detailed prospect data.

63. The storage medium according to claim 62, wherein the summary prospect data corresponds to a time period, the summary prospect data including:

a customer name; and a maturity date.

64. The storage medium according to claim 62, wherein the detailed prospect data includes:

customer data;

a maturity date; and a payoff amount.

65. The storage medium according to claim 62, further comprising the acts of:

determining a time period;

displaying summary prospect data for the determined time period, the summary prospect data corresponding to prospective customers;

receiving a request to display detailed prospect data for a selected one of the prospective customers; and displaying detailed prospect data, the detailed prospect data corresponding to the selected one of the prospective customers.

66. The storage medium according to claim 65, further including the acts of:
receiving comments from the user terminal for the selected prospective customer; and
storing the comments in the database.

67. The storage medium according to claim 65, further including the acts of:
receiving a request for a payoff quote for the selected prospective customer;
determining the payoff quote for the selected prospective customer; and
displaying the payoff quote.

68. The storage medium according to claim 50, wherein the financing program function is a program function, the received data comprising at least one of current program summary data current program detail data and archival program data, the current program summary data identifying programs currently available to the user, the current program detail data identifying programs and corresponding lease rates currently available to the user, the archival program data corresponding to archival data of previous programs and lease rates.

69. The storage medium according to claim 68, further comprising the acts of:
displaying current program summary data for currently available programs;
receiving a request to display current program detail data for a selected one of the currently available programs; and
displaying current program detail data, the current program detail data corresponding to the selected one of the currently available programs.

70. The storage medium according to claim 69, further comprising the acts of:
receiving a request to display archival program data; and
displaying the archival program data.

71. The storage medium according to claim 50, wherein the financing program functions further include a dealer performance reporting function, the received data comprising dealer performance reporting data.

72. The storage medium according to claim 71, wherein the dealer performance reporting data includes:
sales volumes;
efficiency levels;
asset quality; and
delinquency data.

* * * * *